(12) United States Patent
Feller

(10) Patent No.: US 6,530,285 B1
(45) Date of Patent: Mar. 11, 2003

(54) MAGNETIC FLOW SENSOR PROBE

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 09/933,512

(22) Filed: Aug. 20, 2001

(51) Int. Cl.[7] .............................................. G01F 1/58
(52) U.S. Cl. ................................................. 73/861.15
(58) Field of Search ......................... 73/861.08, 861.11, 73/861.12, 861.13, 861.15

(56) References Cited

U.S. PATENT DOCUMENTS

| | | | | |
|---|---|---|---|---|
| 4,459,858 A | * | 7/1984 | Marsh | 73/861.12 |
| 4,825,703 A | * | 5/1989 | Kubota | 73/861.12 |
| 5,691,484 A | * | 11/1997 | Feller | 73/861.13 |

* cited by examiner

Primary Examiner—Hezron Williams
Assistant Examiner—Takisha S Miller
(74) Attorney, Agent, or Firm—David Kiewit

(57) ABSTRACT

A flow sensing head for a magnetic flow sensor may be configured as an insertion probe having one or more flow passageways oriented perpendicular to the magnetic axis of an electromagnet. When a conductive liquid flows through the passageway a voltage is induced between two electrodes spaced out along a line perpendicular to the passageway and to the axis of the electromagnet. A portion of the lead wires from the electrodes is fed through an axial throughhole in a conductive core of the electromagnet in order to electrostatically shield the wires from extraneous voltage sources. A preferred flow sensing head has two flow passageways, each with its own pair of electrodes. Signals from the two pairs of electrodes may be combined in a series-aiding arrangement, or in a parallel arrangement, or the signals from the two pairs of electrodes may be processed independently of each other.

13 Claims, 3 Drawing Sheets

MAGNETIC FLOW SENSOR PROBE

CROSS REFERENCE TO RELATED APPLICATIONS

Not Applicable

BACKGROUND OF THE INVENTION

1. Field of the Invention

This invention relates to apparatus and method for determining the rate of flow of a liquid by measuring an electrical potential difference developed in the liquid as it moves through a magnetic field. The invention particularly addresses the inherent problems related to insertion flow probes.

2. Background Information

In a magnetic flow sensor an electrical potential difference developed in an electrically conductive liquid is detected by a pair of electrodes contacting the liquid which are spaced apart from each other along a line that is generally orthogonal to both the direction in which the flow is measured and a magnetic field produced by an electromagnet. This arrangement is used in most commercially available full bore sensors where the electrodes are typically mounted in electrically insulating liners inside of metal shells, and at the bottom of insertion probe sensors.

Typical full bore magnetic flow sensors provide high precision measurement of flow rate but are bulky and expensive to purchase, install and remove. Typical magnetic probe flow sensors have relatively lower measurement precision and also lack the installation ease of other insertion-type probe sensors. For example, the flow transition around such a probe is abrupt because the bottom of the sensor is the flat end of a relatively stubby cylinder. This can produce turbulence and an uncertain path of the liquid flow producing the electrode signals, ultimately leading to a reduction of measurement precision. Because flow rate detection occurs at only one location in the flow profile, variations in the flow rate at other locations in the flow profile can also affect the measurement accuracy on a volumetric basis. When a probe sensor is mounted in pipes which are not much larger than the probe itself, the probe creates a pressure drop and leads to flow measurement uncertainties which may not be tolerable in some applications. Furthermore, because the signal magnitude depends, in part, on the size of the electromagnet providing the magnetic flux and the distance between the electrodes that is engaged by that flux, probe mechanical mounting diameters must generally be large compared to other types of insertion type sensors in order to produce sufficient electrical signal at the electrodes. Other problems associated with prior art magnetic probe flow sensors include a requirement for a larger opening through a pipe, and the greater pressure that the liquid exerts on the probe. This pressure acts to push the probe out of the pipe and leads to a larger hot tap insertion force because of the larger supporting stem diameter. The stem diameters must then be relatively large to prevent stem deflection at the higher flow rates. And finally, prior art sensors, make relatively inefficient use of the magnetic field and generally require substantially more electrical operating power than do other types of probe sensors.

It is therefore an object to provide a magnetic flow sensing probe which offers significant improvement over the prior art just described.

It is a further object to adapt the improvements of the probe sensor configuration to the inline sensor configuration.

BRIEF SUMMARY OF THE INVENTION

The above and other objects of the invention are attained by magnetic flow sensors in accordance with various preferred embodiments of the present invention. In preferred embodiments, the magnetic axis (i.e., the line extending from the south to the north pole) of an electromagnet is oriented generally perpendicular to a direction of flow of a conductive liquid. As is known in the magnetic flow metering art, the flux from a magnet arranged in this fashion generates in the liquid a voltage difference proportional to the flow rate of the liquid. In various embodiments of this invention this voltage difference is sensed by a sensing head comprising, in addition to the magnet, a pair of electrodes (which preferably have the same size and shape and are made of the same material) spaced apart from each other along a separation line that is generally orthogonal to both a direction of flow and the magnetic axis. These electrodes may be located in a circular shroud.

The voltage indicative of flow rate is measured between the corresponding two electrodes of a pair when the associated magnetic flux is present and stable, as is known in the magnetic flow metering art. This may consist of a cyclic processing procedure including the measurement and storage of first a first electrode difference potential when no magnetic field is present, followed by a similar measurement with the field present. In this arrangement, the difference between the two measurements is representative of the liquid flow rate.

In a preferred embodiment of the present invention the flow passage is defined by a cylindrical shroud and the electromagnet is located close to the region of fluid flow being sensed by the electrodes so that the flux which it produces is more effectively used to generate the flow related potentials in the liquid. This close spacing is facilitated by routing the signal leads from the electrodes directly through a hole in the core of the electromagnet instead of running outside of the electromagnet, as is done in the prior art. The core, or at least a portion thereof, is preferably electrically conductive and grounded so that the leads are electrostatically shielded from the relatively high potentials existing on the outside of the coil of the electromagnet. This enables the signal amplifiers to experience lower voltage transients before the magnetic flux stabilizes. The amplifiers can recover faster and accurately detect the electrode voltages sooner after the flux stabilizes, thereby reducing electrical power consumption. It has been confirmed in practical examples that the magnetically induced voltages in the leads are common mode voltages and of a low enough magnitude to be well tolerated by the signal amplifiers. These voltages are inherently equal as they are derived from conductive paths that are easily made mechanically the same and symmetrically located around the core. This is much more difficult to achieve if the leads are instead routed on the outside of the coil where both magnetic and electrostatic induced voltages have to be coped with. Routing the leads through the core also enables the outside of the housing containing the electromagnet to be smaller.

The obstruction free shroud enables a relatively smooth and predictable passage of flow to be realized improving the precision of the liquid flow rate measurement. The improved magnetic flux utilization and electrode signal routing enables a smaller magnet and its housing to be used, thereby reducing its physical dimensions and that of the supporting stem. This reduces the flow obstruction and permits the supporting stem diameter to be made relatively small.

In another preferred embodiment of the present invention, an electromagnet similar to the one described above has a second, similarly configured flow shroud and electrode pair located on its opposite pole. The signals from both sets of electrodes may be directly electrically summed or otherwise combined, or may be passed through individual electronic processing circuits where they may be examined individually, compared and combined as desired. When the signals are directly combined in series aiding the net output signal approaches twice that from a single electrode pair. If desired, the shroud, magnet size and overall mechanical structure can be substantially reduced and still provide the same signal sensitivity as in the single channel embodiment described previously while being less obstructive of the flow path and easier to insert under pressure. The utilization of the previously unused magnetic field for the second shroud enables higher energy efficiency to be achieved as most of the energy used by magnetic flow sensors is for generating the magnetic field. Furthermore, The flow sensing at the two spaced apart locations provides a better sample of the overall flow rate for better volumetric accuracy. Using the same configuration more than one set of such dual sensing heads may be mounted in line one after the other to sense the flow rate over a large linear distance.

The present invention, although developed for insertion probes, could be applied to inline flow sensors in some applications, when energy efficiency is important as in the case of battery and current loop powered equipment.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 1a is a partly schematic front cross-sectional view, taken perpendicular to a flow direction, of the sensing head portion of a flow sensor of the invention.

FIG. 1b is a side elevational view of the sensing head of FIG. 1a.

FIG. 1c is a top section view of the sensing head of FIG. 1b as indicated by the double-headed arrow 1c—1c in FIG. 1b.

FIG. 2a is a front cross-sectional view of a second flow sensing head of the invention.

FIG. 2b is a side elevational view of the sensing head of FIG. 2a.

FIG. 2c is a top section view of the sensing head of FIG. 2b as indicated by the double-headed arrow 2c—2c in FIG. 2b.

DETAILED DESCRIPTION OF THE INVENTION

Figures 1A, 1B, 1C:
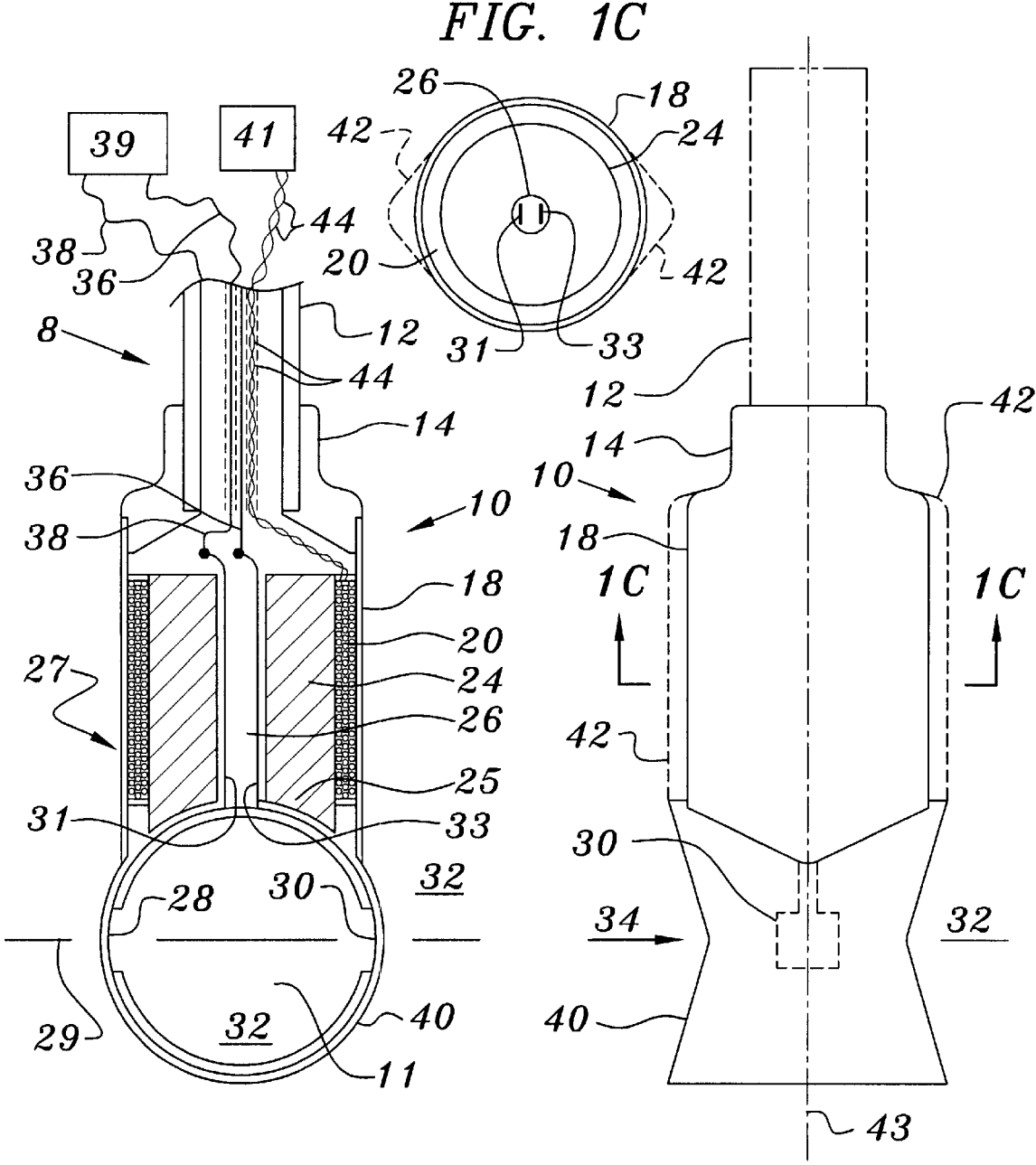

A magnetic flow sensor 8 of the invention preferably incorporates a sensing head or probe. 10 comprising at least one electromagnet 27 adjacent one or more flow passages 11, known signal processing electronics 39, and at least one source of electric power 41 for powering the electromagnet 27 and the signal processing electronics 39. The electromagnet 27 comprises a core 24 having at least one coil 20 or winding disposed thereabout. A core 24, preferably made from a magnetic material of moderate electrical conductivity, such as powdered iron, is generally cylindrical in shape, although an end 25 of the core adjacent the flow passage 11 may have an arcuate profile to fit around the flow passage 11, as will be discussed in greater detail later herein. A preferred core 24 comprises a central throughhole 26 that extends along an axis 43 of the sensing head 10. As is known in the magnetic flow metering arts, an electromagnet positioned in this fashion can be used to generate a magnetic field along the axis 43 of the sensing head, which is set perpendicular to the direction 34 in which the liquid 32 flows through the passage 11. In a preferred embodiment, housing 18, cap 14 and stem 12 portions of the probe 10 mechanically contain and protect the flow sensing components, as well as providing a conduit for various electrical wiring used to make electrical connections between the sensing head 10 and external signal processing electronics 39 and power supplies 41. A probe 10 of the type described here may also comprise optional flow streamlining portions 42 depicted in phantom in the drawing.

When a preferred sensing head 10 of the invention is used for measuring flow, a portion of the flowing liquid 32, passes through a passageway 11 within a shroud 40 that houses the sensing electrodes 28, 30, which are spaced out along a separation line 29 that is generally perpendicular to both the axis 34 of the passage 11—i.e., the direction that liquid flows through the passage—and to the axis 43 of the magnetic field and the probe. Electrode leads 31, 33 extend from the electrodes to known signal processing electronics 39. These leads 31, 33 are preferably routed through the axial throughhole 26 in the magnetic core 24 which is surrounded by the coil 20. Portions of the leads 31, 33 extending from the end of the coil distal from the flow passage have conductive jackets and thus comprise respective coaxial shielded portions 38, 36. In addition to the signal leads, wires 44 that electrically connect the coil 20 to a source of electric power 41 may also be brought out through the stem 12. This method of assembly enables the shroud to have a relatively thin wall which is an advantage in minimally disturbing the flow of the liquid 32.

The electrodes 28 and 30 may be made from thin metal sheets (e.g., 0.010 inch thick stainless steel) that are wetted, through openings in the shroud 40, by whatever liquid is present. The position and outline of one of the electrodes 30 is depicted in phantom in FIG. 1b to indicate its size and orientation. In a preferred embodiment, the lead 33 and electrode 30 may be cut from one sheet of metal that is insulated by suitable dielectrics (not shown) so as to avoid electrical contact with any electrically conductive portion of the core or with the other lead. In a preferred embodiment the core 24 may have an arcuate end 25 in order to maximally provide flux in the vicinity of the line 29 between the electrodes 28 and 30.

The flow obstruction posed by the housing 18, cap 14 and stem 12 primarily determines the angular loading on the stem 12 at high flow rates. Of these items, the housing 18 normally has the greatest influence because it offers the greatest flow obstruction at nearly the greatest leverage arm. By operating the magnetic circuit more efficiently and routing the electrode leads through the core, the resultant reduction in flow obstruction can enable the stem diameter to be reduced. The reduction in that diameter will also, because of its far greater potential length, significantly reduce flow obstruction. The overall design lends itself to the inclusion of components 42 to help divert the flow around housing 18 and further reduce its flow obstructive effects.

Figures 2A, 2B, 2C:
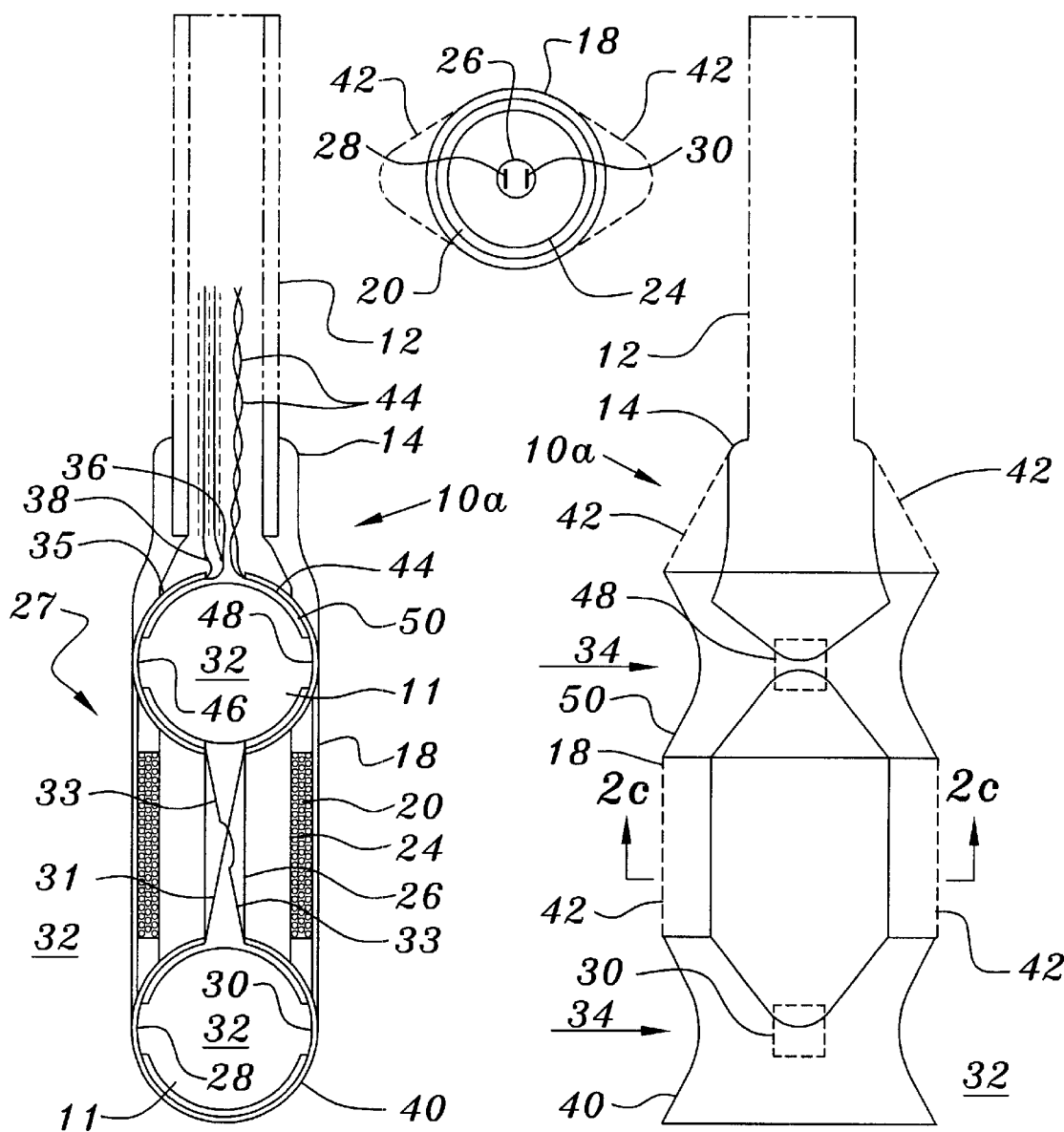

A sensing head 10a having two flow passages is depicted in FIGS. 2a–2c. In this device a liquid 32 flows through passageways 11 defined by shrouds 40, 50 having pairs of electrodes 28, 30; 46, 48 respectively disposed therein. Leads from the electrodes 28 and 30 in the lower shroud pass through a hole 26 in the magnetic core 24 which is surrounded by coil 20. In a preferred series adding arrangement the lead wire 31 from one of the lower electrodes 28 connects to an electrode 48 on the opposite side of the upper passageway. The lead wire 33 from the other lower electrode 30 and a lead 35 from the other upper electrode 46 are brought up the stem as shielded cables 36 and 38. This series aiding arrangement yields a summation of the electrode signals. As previously discussed, the wires 44 from the coil 20 are also routed up the stem 12 to the electric power source 41. In order to minimize coupling to the electrodes, the two coil wires 44 are selected to be of equal length and are routed together around the upper passage way.

The dual flow sensing head 10a utilizes the flux from the top of the electromagnet 27, which would otherwise have been wasted, to generate an additional flow-related signal. In the embodiment discussed above, the dynamic range of the flow sensor may be extended to lower flow rates when compared to a single flow sensing head because the flow related signals are in phase and are additive while the electrode noise signals are of a random nature. Thus, the signal to noise ratio at a given flow rate is higher when the electrodes are connected in a series aiding fashion. Alternately, of course, one may connect the electrode pairs in parallel by connecting each electrode 28, 30 in the flow passage more distal from the stem to that electrode 46, 48 that is on the same side of the housing in the flow passage proximal the stem. It may be noted that one can also elect to separately bring out both of the leads from both pairs of electrodes to two respective sets of processing electronics in order to make two independent measurements. In this case a difference between the signals generated by flow in the two passageways would likely be an indication of sensor malfunction or accumulation of scale or debris. When the difference in output signals is great enough, it can be used to disable the contribution of the signal suspected of being in error while compensating with a corresponding adjustment of the scaling factor of the other signal, and to activate an alarm calling for sensor servicing.

The dual signal generation capability of sensing head 10a also allows a reduction of the diameter of the electromagnet housing 18 so that a smaller installation opening into a pipe or other flow channel is needed than would be required with the single passageway sensing head 10. Moreover, the flow obstruction would also be less, thereby securing additional advantages, as indicated earlier. Sensing flow at two locations in the flow profile better samples the flow measurement and improves measurement accuracy, particularly with respect to volumetric measurement. Additionally, more than one dual sensing heads 10a may be lined up across a pipe to make a highly precise volumetric flow measurement even though the flow profile might change significantly.

As an alternate to the depicted embodiments having the passageways oriented parallel to the flow direction 34, one could add additional plumbing (not shown) so the liquid would enter one shroud and then be coupled back to enter the other shroud from the opposite direction. If, for example, the outputs from the electrodes are directly connected to sum their signals electrode 30 would then be connected to electrode 48 while the output signals would appear on electrodes 28 and 46.

Figure 3:
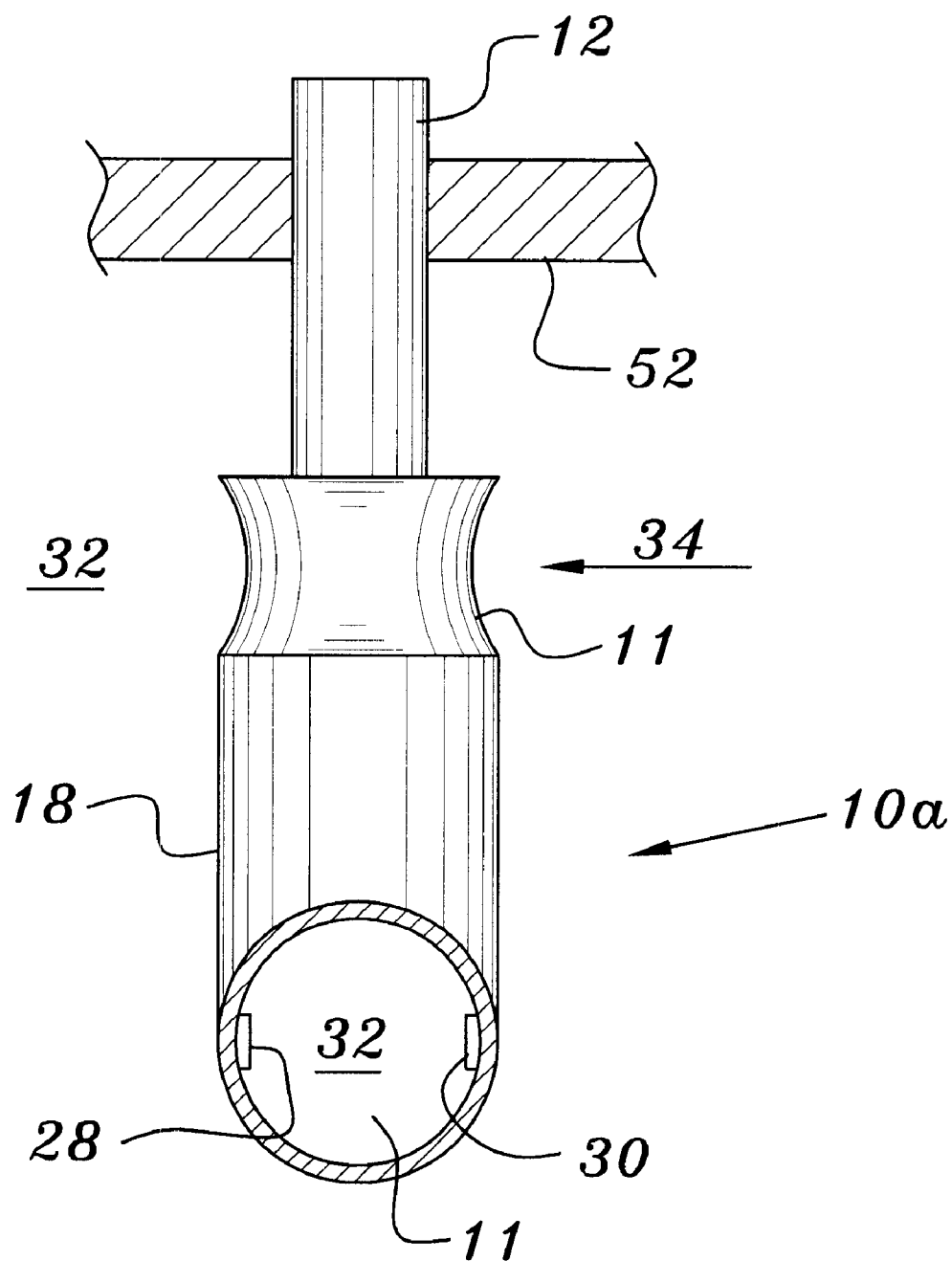
FIG. 3 is an elevational view of a sensing head having two orthogonal flow passages

The improved energy efficiency of the 10a sensing head suggests its use for battery powered equipment not only in conventional flow sensing applications, but also in standalone water current measuring applications as might be used in ocean current research, for example. In this type of application one needs to determine both the direction of net flow and the flow rate. Hence, a flow sensor of the invention used for this purpose would have two flow passages that are perpendicular to each other, as depicted in FIG. 3. In this sort of apparatus the two pairs of electrodes 28, 30; 46, 48 are spaced apart along two mutually perpendicular separation lines, each of the separation lines respectively perpendicular to the flow direction through the passageway with which it is associated.

Although the present invention has been with described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A flow probe portion of a flow sensor for measuring a flow rate component along a selected direction of an electrically conducting flowing liquid, the probe comprising:

a pair of electrodes spaced apart along a separation line generally perpendicular to the selected direction, the electrodes arranged to be wetted if any of the liquid is present in a flow passage portion of the probe;

an electromagnet comprising a coil disposed about a core having a throughhole along an axis thereof, the coil arranged to provide a magnetic field along the axis when a source of electric power is attached thereto, the axis generally orthogonal to both the selected direction and the separation line; and, a pair of electrode leads, each of the electrode leads extending from a respective electrode through the throughhole in the core and through a stem portion of the probe.

2. The flow probe of claim 1, wherein each of the electrode leads comprises a coaxially shielded portion.

3. The flow probe of claim 1, wherein the flow passage is adjacent a first of two ends of the electromagnet, the probe further comprising a second flow passage adjacent the second end of the electromagnet, the second flow passage having a second pair of electrodes disposed therein.

4. The flow probe of claim 1 wherein an end of the core of the electromagnet adjacent the flow passage has an arcuate profile.

5. A flow probe portion of a magnetic flow sensor for measuring the rate of flow of an electrically conducting liquid, the probe having an axis, the probe comprising a single electromagnet operatively associated with two flow passages, wherein:

the probe comprises a stem having two ends, the stem extending along the axis of the probe;

the first flow passage is adjacent one of the ends of the stem, the first flow passage defining a first flow direction perpendicular to the axis of the probe;

the first flow passage comprises a first pair of electrodes arranged so as to be wetted if any of the liquid is in the first flow passage, the first pair of electrodes spaced apart along a first separation line perpendicular to the axis of the probe and to the first flow direction;

the single electromagnet comprises an electrically conductive core, the core comprising a throughhole extending along the axis of the probe, the electromagnet disposed more distally from the one of the ends of the stem than is the first flow passage;

the second flow passage is disposed more distally from the one of the ends of the stem than is the electromagnet, the second flow passage defining a second flow direction perpendicular to the axis of the probe; and wherein the second flow passage comprises a second pair of electrodes arranged so as to be wetted if any of the liquid is in the second flow passage, the second pair of electrodes spaced apart along a second separation line perpendicular to the axis of the probe and to the second flow direction, a respective electrode lead extending from each of the second pair of electrodes through the throughhole in the core.

6. The flow probe of claim 5 wherein the first separation line is parallel to the second separation line, whereby the first flow direction and the second flow direction are parallel.

7. The flow probe of claim 5 wherein each of the electrode leads is electrically connected to a respective one of the first pair of electrodes.

8. The flow probe of claim 5 further comprising a second pair of electrode leads, each of the second pair of electrode leads extending from a respective one of the first pair of electrodes through the stem.

9. The flow probe of claim 5 wherein the portions of the electrode leads extending through the stem comprise coaxially shielded portions.

10. The flow probe of claim 5 wherein the first separation line is parallel Lo the second separation line and wherein the first and second pairs of electrodes are connected in a series aiding arrangement in which one of the first pair of electrodes is connected to that one of the second pair of electrodes that is disposed on an opposite side of the probe and in which the electrode leads from the remaining two electrodes extend through the stem.

11. The flow probe of claim 5 wherein the first separation line is parallel to the second separation line and wherein the first and second pairs of electrodes are connected in a parallel arrangement in which each of the first pair of electrodes is connected to that one of the second pair of electrodes that is disposed on the same side of the probe.

12. The flow probe of claim 5 wherein the first separation line is parallel to the second separation line and wherein each electrode of the two pairs thereof is connected to a respective electrode lead that extends through the stem.

13. The flow probe of claim 5 wherein the first flow direction is perpendicular to the second flow direction and the first separation line is perpendicular to the second separation line.

* * * * *